Jan. 2, 1945.    W. R. UHLEMANN ET AL    2,366,659
OPHTHALMIC MOUNTING
Filed Dec. 9, 1940    3 Sheets-Sheet 1

Inventors
William R. Uhlemann
& Richard H. Uhlemann
By Thiess, Olson & Mecklenburger
Attys.

Jan. 2, 1945.   W. R. UHLEMANN ET AL   2,366,659
OPHTHALMIC MOUNTING
Filed Dec. 9, 1940   3 Sheets-Sheet 2
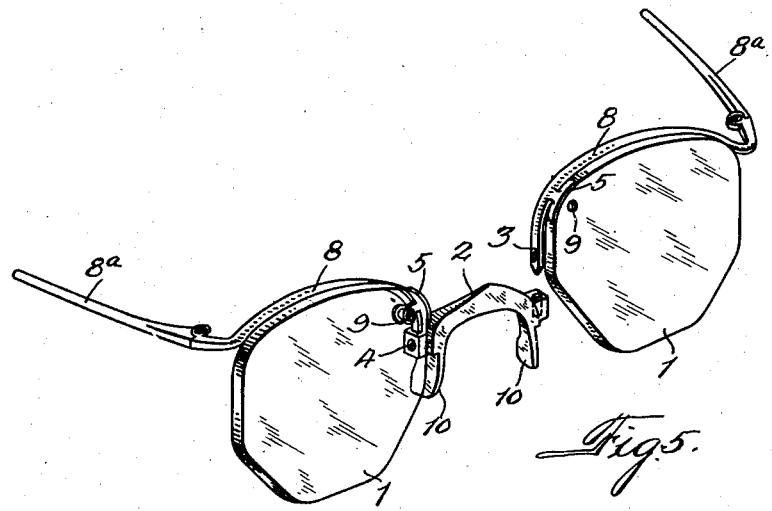
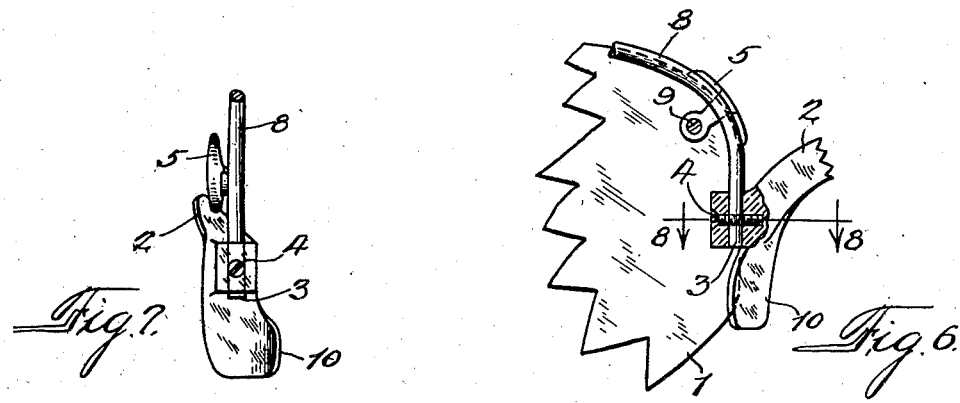
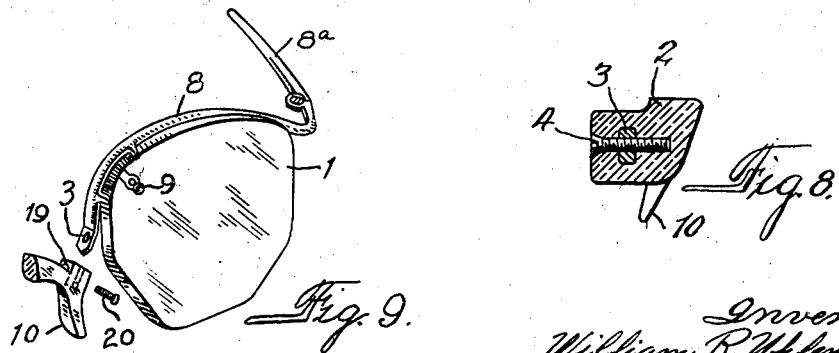

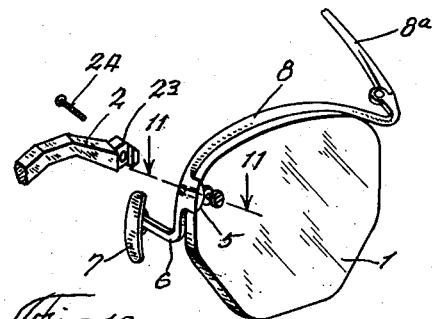
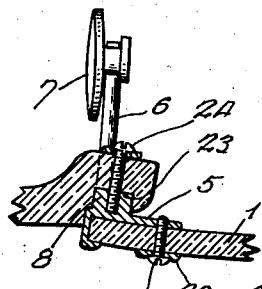
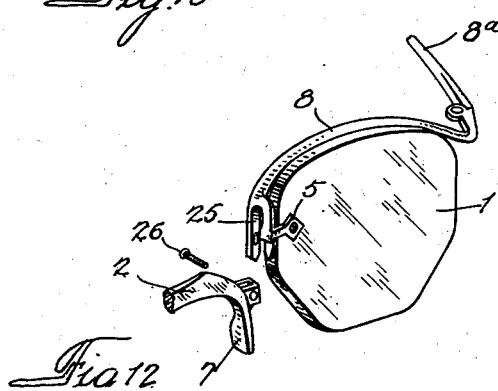
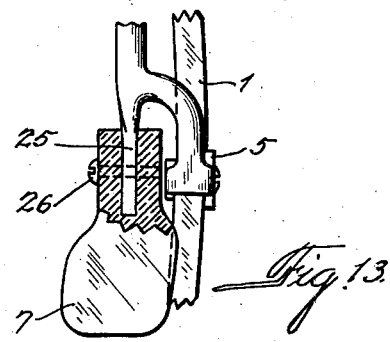

Patented Jan. 2, 1945

2,366,659

UNITED STATES PATENT OFFICE 2,366,659

OPHTHALMIC MOUNTING

William R. Uhlemann, Evanston, and Richard H. Uhlemann, Antioch, Ill., assignors to Uhlemann Optical Co. of Illinois, Chicago, Ill., a corporation of Delaware Application December 9, 1940, Serial No. 369,158

4 Claims. (Cl. 88—41)

This invention relates to mountings for ophthalmic lenses.

This application is a continuation as to common subject matter disclosed of our co-pending application Serial No. 269,450, filed April 22, 1939, which has issued as Patent No. 2,308,253.

One of the objects of our invention is to provide an improved mounting for ophthalmic lenses which will be inconspicuous when worn.

A further object is to provide such a mounting in which the lens, strap, guard arm, guard, and temple-supporting wire are made up as a unit which can be readily attached and detached with respect to a bridge of suitable material, such, for example, as molded or formed translucent substances, so that the entire mounting, including the bridge and the temple-supporting wire following the periphery of the lens in the rear thereof, will be extremely inconspicuous.

A further object of our invention is to provide an ophthalmic mounting made up of readily interchangeable detachable units which will require a relatively small number of bridges and units being kept in stock and yet will enable the optician to make a large number of combinations to take care of different spacing of focal centers, differences in features of the wearers, and different styles of mountings.

A further object of our invention is to provide a construction in which the temple-supporting wires and nose guard supports may be readily adjusted without disturbing the relative positioning of the lens strap and bridge.

Further objects and advantages of the invention will be apparent from the description and claims.

In the drawings, in which several forms of our invention are shown,

Fig. 5 is a perspective view showing another form of mounting with the unit separated from the bridge;

Fig. 6 is an enlarged view, partly in section, showing the connection between the unit and bridge;

Fig. 7 is an elevational view from the left of the parts of the mounting shown in Fig. 6;

Fig. 8 is a section on the line 8—8 of Fig. 6;

Fig. 9 is a perspective view of another form of mounting showing the unit disconnected from the bridge;

Fig. 10 is a perspective view showing another form of mounting;

Fig. 11 is a section substantially on the line 11—11 of Fig. 10;

Fig. 12 is a perspective view of another form of mounting;

Fig. 13 is a detail view of the detachable unit as seen from the left in Fig. 12.

Figure 1:
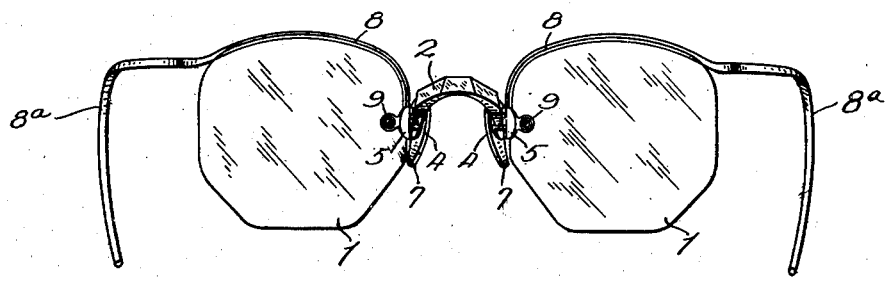
Figure 1 is a front view of a lens mounting and lenses.
Figure 2:
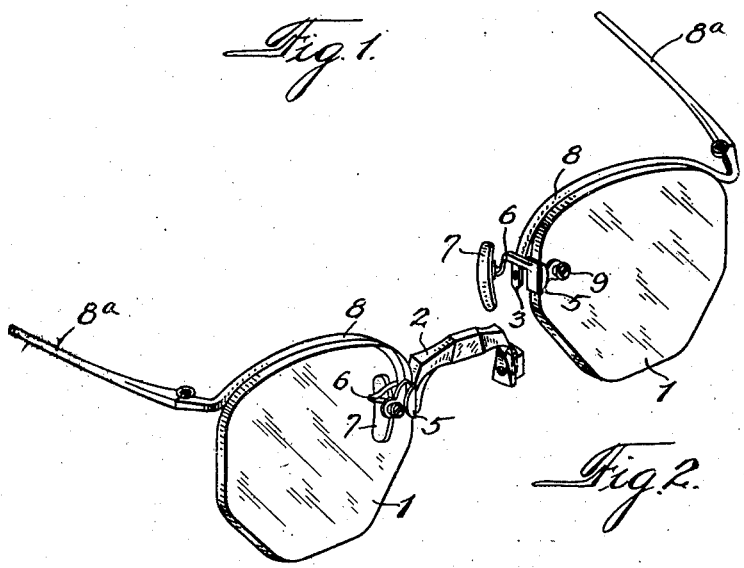
Fig. 2 is a perspective view showing one of the units separated from the bridge.
Figure 3:
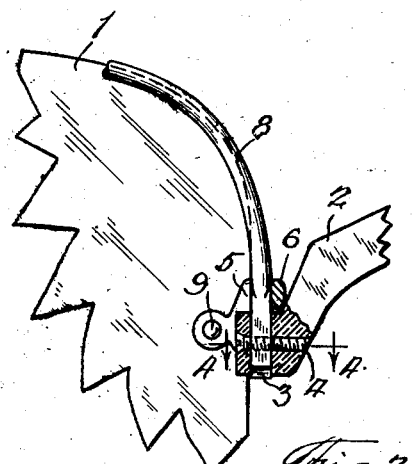
Fig. 3 is an enlarged view showing the connection between the unit and bridge.
Figure 4:
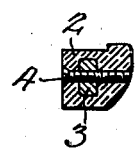
Fig. 4 is a section on the line 4—4 of Fig. 3.

Referring to the drawings in detail, and first to the form shown in Figs. 1–4, incl., the construction therein shown comprises a pair of lenses 1, a bridge 2 of molded or formed translucent, tough, nonbrittle material having a pair of apertures or sockets, one on each end of the bridge, and a pair of units, each having a projecting finger 3 for insertion into one of the sockets in the bridge and having means, such as a screw 4, extending through registering openings in the bridge and projecting finger 3 whereby the unit, including the strap 5, guard arm 6, guard 7, temple-supporting wire 8, and temple 8a, may be readily attached and detached as a unit with respect to the bridge 2. The projecting finger 3 may be formed as an integral part of the temple-supporting wire.

The strap 5 and guard arm 6 may be formed of an integral wire secured, as by soldering or riveting, to the temple-supporting wire 8. The temple-supporting wire follows the contour of the upper edge of the lens 1 and lies in the rear of the lens so that it is inconspicuous when worn. The temple-supporting wire 8 is not directly secured to the lens so that a pull on this wire does not apply any strain to, or tend to break out, a portion of the lens. The lens 1 is secured to the strap 5 by means of a single screw 9 which thus furnishes a one-point securing means for the lens.

The temple-supporting wire 8, lens-supporting strap 5, and guard arm 6 may be made up as a unit and these units may be kept in stock. By making different selections from these stock units and from the different bridges kept in stock, a large number of combinations may be built up. The proper spacing of the focal centers of the two lenses may be secured by choosing a bridge which will give the required distance between centers. The adjustments for the nose guards and for the temples may be made without disturbing the distance between focal centers of the lenses.

The construction shown in Figs. 5, 6, 7, and 8 is similar to that just described. In this form, however, the nose guards may be formed as integral parts of the central bridge 2 and comprise formed end portions 10. The lens-supporting straps 5 may be secured in any suitable manner to the temple-supporting wires 8 as by soldering or riveting. The end of the temple-supporting wire 8 is also provided with a projecting finger 3 which may be secured to the bridge by means of a screw 4 extending through registering openings in the bridge and in the end of the temple-supporting wire and threaded into the wire.

The advantages just discussed in connection with the form shown in Figs. 1, 2, 3, and 4 are also found in the construction of Figs. 5, 6, 7, and 8, except that in the form shown in Figs. 5-8, incl., a bridge would have to be chosen which would not only give the required spacing for the focal centers of the lenses but which would also accommodate the nose of the wearer.

In the construction shown in Fig. 9, each side of the bridge may be provided with an upwardly and outwardly extending lug 19 having a recess or socket to receive the end 3 of the temple-supporting wire 8. The end of the temple-supporting wire is inserted into this socket and secured in place by means of a screw 20 extending through an opening in the wall of the socket and threaded into the end of the securing finger. In this form the nose guard may comprise portions 10 made as an integral part of the bridge. The lens-supporting strap 5 may be secured to the temple-supporting wire 8 adjacent the upper nasal portion of the mounting in any suitable manner, as by soldering or riveting.

The construction shown in Figs. 10 and 11 comprises a bridge 2 which may be of molded or formed plastic, translucent material and a detachable subassembly unit comprising the temple-supporting wire 8, the temple 8a, the lens strap 5, the lens 1, the guard-supporting arm 6, and the guard 7. The guard-supporting arm 6 extends downwardly from the strap 5 a short distance following the contour of the edge of the lens and thence horizontally and rearwardly to its connection with the guard 7. The strap comprises a large flange portion engaging the inner face of the lens and a narrow flange portion engaging the outer face of the lens near its edge. The lens is secured in the strap by means of a screw 21 extending through a washer member 22, and through an opening in the lens, and threaded into the large flange of the strap. The temple-supporting wire 8 is secured to the strap in any suitable manner, as by soldering or riveting. The unit is secured to the bridge by seating the temple-supporting wire and strap in a recess or channel 23 in the bridge and inserting the screw 24 through an opening in the bridge and threading it into the temple-supporting wire 8.

The construction shown in Figs. 12 and 13 comprises the bridge 2 and a detachable unit. The detachable unit comprises the temple-supporting wire 8, the lens-supporting strap 5, and the temple 8a. The nose guard 7 may be formed as an integral part of the bridge. The temple-supporting wire 8 is provided with a downwardly-extending portion 25 which is inserted into a socket or recess in the bridge and secured in place by means of a screw 26 extending through registering openings in the bridge and temple-supporting wire.

In constructions in which the bridge is formed of molded or formed plastic material, this material may, if desired, be made in various colors from which a selection suitable for the individual wearer may be made. It will be noted that the lens unit may be secured to the bridge by means of readily accessible, easily insertable and detachable screws, so that it is a simple matter to make up many different styles of mounting from a comparatively small stock of the units. It will be seen that the combination of translucent bridge and readily attachable and detachable assembly-supporting wire unit provides a construction in which the entire mounting will be extremely inconspicuous. It will also be seen that by means of the readily interchangeable detachable units, the optician will need to keep in stock only a relatively small number of bridges and units from which he can make up a large number of combinations to take care of different spacings of focal centers, difference in features of the wearers, and different styles of mounting.

Further modifications will be apparent to those skilled in the art, and it is desired, therefore, that the invention be limited only by the scope of the appended claims.

Having thus described our invention, what we claim and desire to secure by Letters Patent is:

1. An ophthalmic mounting wherein individual lens-holding and assembly-supporting units may be selectively combined with a number of different bridges, comprising a substantially nonpliable bridge, two subassembly units on opposite sides of said bridge, each subassembly unit comprising a lens-holding strap forming the sole connection between the lens and mounting and a pliable temple-supporting wire permanently secured together, and readily manipulatable means for quickly connecting and disconnecting said units with respect to said bridge, said bridge being of molded or formed plastic material having a hole into which the end of said temple-supporting wire is inserted endwise, the only connection between said temple-supporting wire and the lens being on the nasal side of the lens, said temple-supporting wire terminating in a hinge connection for the temple on the temple side of the lens.

2. An ophthalmic mounting wherein individual lens-holding and assembly-supporting units may be selectively combined with a number of different bridges, comprising a substantially nonpliable bridge, two subassembly units on opposite sides of said bridge, each subassembly unit comprising a lens-holding strap forming the sole connection between the lens and mounting and a pliable temple-supporting wire permanently secured together, and readily manipulatable means for quickly connecting and disconnecting said units with respect to said bridge, said bridge being of molded or formed plastic material having a lug extending laterally from one leg thereof, said lug having a hole into which the end of said temple-supporting wire is inserted endwise, the only connection between said temple-supporting wire and the lens being on the nasal side of the lens, said temple-supporting wire terminating in a hinge connection for the temple on the temple side of the lens.

3. An ophthalmic mounting wherein individual lens-holding and assembly-supporting units may be selectively combined with a number of different bridges, comprising a bridge, two subassembly units on opposite sides of said bridge, each subassembly unit comprising a lens-holding strap forming the sole connection between the lens and mounting and a pliable temple-supporting wire permanently secured together, and readily manipulatable means for quickly connecting and disconnecting said units with respect to said bridge, said bridge being of molded plastic material having a recess to receive the end of said temple-supporting wire, the only connection between said temple-supporting wire and the lens being on the nasal side of the lens, said temple-supporting wire terminating in a hinge connection for the temple on the temple side of the lens.

4. An ophthalmic mounting wherein individual lens-holding and assembly-supporting units may be selectively combined with a number of different bridges, comprising a bridge, two subassembly units on opposite sides of said bridge, each subassembly unit comprising a lens-holding strap forming the sole connection between the lens and mounting and a pliable temple-supporting wire permanently secured together, and readily manipulatable screw means for quickly connecting and disconnecting said units with respect to said bridge, said bridge being of molded plastic material having a recess to receive the end of said temple-supporting wire.

WILLIAM R. UHLEMANN.
RICHARD H. UHLEMANN.